United States Patent [19]

Masterman

[11] Patent Number: 4,780,634
[45] Date of Patent: Oct. 25, 1988

[54] ALTERNATING-CURRENT ELECTRICAL GENERATORS

[75] Inventor: John M. Masterman, The Reddings, United Kingdom

[73] Assignee: Dowty Fuel Systems Limited, Cheltenham, England

[21] Appl. No.: 70,925

[22] Filed: Jul. 8, 1987

Related U.S. Application Data

[63] Continuation-in-part of Ser. No. 812,951, Dec. 24, 1985.

[30] Foreign Application Priority Data

Jan. 17, 1985 [GB] United Kingdom ................. 8501215

[51] Int. Cl.$^4$ .............................................. H02K 3/00
[52] U.S. Cl. .................... 310/179; 310/156; 310/184; 310/187; 310/216; 310/254
[58] Field of Search ............... 310/180, 185, 184, 179, 310/156, 172, 186, 187, 188, 208, 258, 259, 254, 216, 217, 218, 105, 198

[56] References Cited

U.S. PATENT DOCUMENTS

| | | | |
|---|---|---|---|
| 1,401,996 | 1/1922 | Lundell | 310/180 |
| 3,207,935 | 9/1965 | Mosovsky | 310/180 |
| 3,858,308 | 1/1975 | Peterson | 310/156 |
| 4,144,470 | 3/1979 | Avinger | 310/198 |
| 4,163,915 | 8/1979 | Fong | 310/198 |
| 4,554,491 | 11/1985 | Plunkett | 310/186 |
| 4,700,098 | 10/1987 | Kawashima | 310/156 |

FOREIGN PATENT DOCUMENTS 1942855 8/1973 Fed. Rep. of Germany ...... 310/156

Primary Examiner—R. Skudy
Attorney, Agent, or Firm—Davis, Bujold & Streck

[57] ABSTRACT

An alternating electrical generator which is adapted to reduce/eliminate "Iron losses" and the associated problems of overheating of the windings comprises
  a rotor;
  a plurality of pole sections spaced around the circumference of a rotor core member at a constant pole section pitch;
  a toothed stator;
  two or more independent windings; and,
  a plurality of bridge members to separate adjacent windings.

The bridge members have a length equal to an even number of pole section lengths, to ensure that any bridge member is exposed to equal amount of each magnetic polarity. Thereby, ensuring that the net effect under the bridge member is zero.

7 Claims, 3 Drawing Sheets

ALTERNATING-CURRENT ELECTRICAL GENERATORS

This is a continuation-in-part of copending application(s) Ser. No. 812,951 filed on Dec. 24, 1985.

This invention relates to electrical generators and, in particular single phase and multi-phase alternating-current electrical generators.

Known types of alternating-current electrical generator comprise a rotor, a toothed stator and at least two windings which are associated with teeth of the stator. Each of these windings are substantially similar to, but independent of one another so that in the event of failure of one of the windings the other windings will continue to function normally.

A well appreciated problem associated with these generators is the so called "Iron-losses" generated in the area between the adjacent ends of the windings.

Iron losses are primarily caused by eddy currents which are generated in the stator. These eddy currents in turn, lead to over heating of the stator and a subsequent/resultant efficiency loss. Overheating also causes a shortening in the life of the windings, because of thermal degradation of the coil insulation.

This type of generator is commonly used in aircraft engines, and any efficiency loss could easily have drastic consequences. Therefore, in an attempt to ensure that any efficiency loss is not critical the generator is considerably overdesigned leading to an increase in weight and space occupied.

The present invention is concerned with reducing the "Iron-losses" to a minimum, thereby eliminating the problem of excessive heating.

In accordance with the present invention an alternating-current electrical generator comprises:
  a rotor having a plurality of pole sections spaced around the circumference thereof at a constant pole section pitch;
  a stator, which has a number of teeth;
  two or more windings independent of one another which are wound in association with the teeth of the stator;
  and, a plurality of bridge members having a length equal to an even number of pole section lengths wherein each bridge member is positioned between adjacent windings.

By making the bridge members of a length equal to an even number of pole section lengths, it is ensured that the bridge member is exposed to equal amounts of negative and positive magnetic flux. The resulting fluxes induced in the bridge member are therefore equal but opposite and no net flux is induced in the bridge member. The elimination of flux effects in this manner means negligible flux enters the stator circuit substantially reducing the "Iron losses" in the stator as a whole.

In a preferred type of alternating-current electrical generator each of the bridge members is supported by at least one unwound tooth carried by the stator. Preferably there are two unwound teeth supporting each of the bridge members.

With the bridge member being supported between two unwound teeth the bridge member is, normally positioned so that it interconnects the two unwound teeth with the teeth being at opposite ends.

In an alternative type of generator three unwound teeth are used to support each of the bridge members. In this case the third tooth would normally be centrally interposed between the other two teeth, so that it dissects the bridge member.

Preferably the stator is formed from a laminated structure. The laminated structure may be made up from layers of any soft magnetic material such as silicon iron.

The stator maybe formed with an appropriate number of teeth having an appropriate number of bridge members which may be formed on the stator using any one of the known/conventional methods. Preferably each bridge member and the unwound teeth are formed as an integral part of the stator. That is to say, the laminated plates of the stator are formed (shaped) so as to incorporate the teeth and the bridge members within the overall shape.

With known methods of shaping and forming complexly shaped articles can be formed from sheets of materials easily and very accurately. Therefore the spacing of the teeth and the length of the bridge member can be accurately attained by using this type of approach.

In alternative methods the teeth may be attached to the stator in a subsequent operation. This method can lead to a stator having equally accurate spacing and bridge member length. However, because of the necessary mechanised operations it will be more expensive to produce stators by this method than by the above preferred method.

Preferably the pole sections are permanent magnets. Preferably the pole sections are substantially physically identical to one another i.e. of identical dimensions but opposing polarities for adjacent pole sections.

In an envisaged arrangement the pole sections are locked together to form a layer which circumferentially surrounds a rotor core member to form a rotor. The rotor, in turn, circumferentially surrounded by the stator. The pole sections being arranged so that adjacent pole sections are of opposite polarity Each of the pole sections will be arcuate in form, and having pole section length that is substantially identical to the length of the other pole sections spaced about the circumference of the rotor, with the internal face facing the rotor core member and the external face facing the stator. The external face will have a length which for the record is defined as the pole section length.

The invention also includes a method of reducing parasitic "Iron-losses" in an alternating current electrical generator as hereinbefore described, which method comprises providing the generator with a bridge member having a length equal to an even number of pole section lengths.

The invention will now be described, by way of example, with reference to the accompanying drawings in which.

Figure 1:
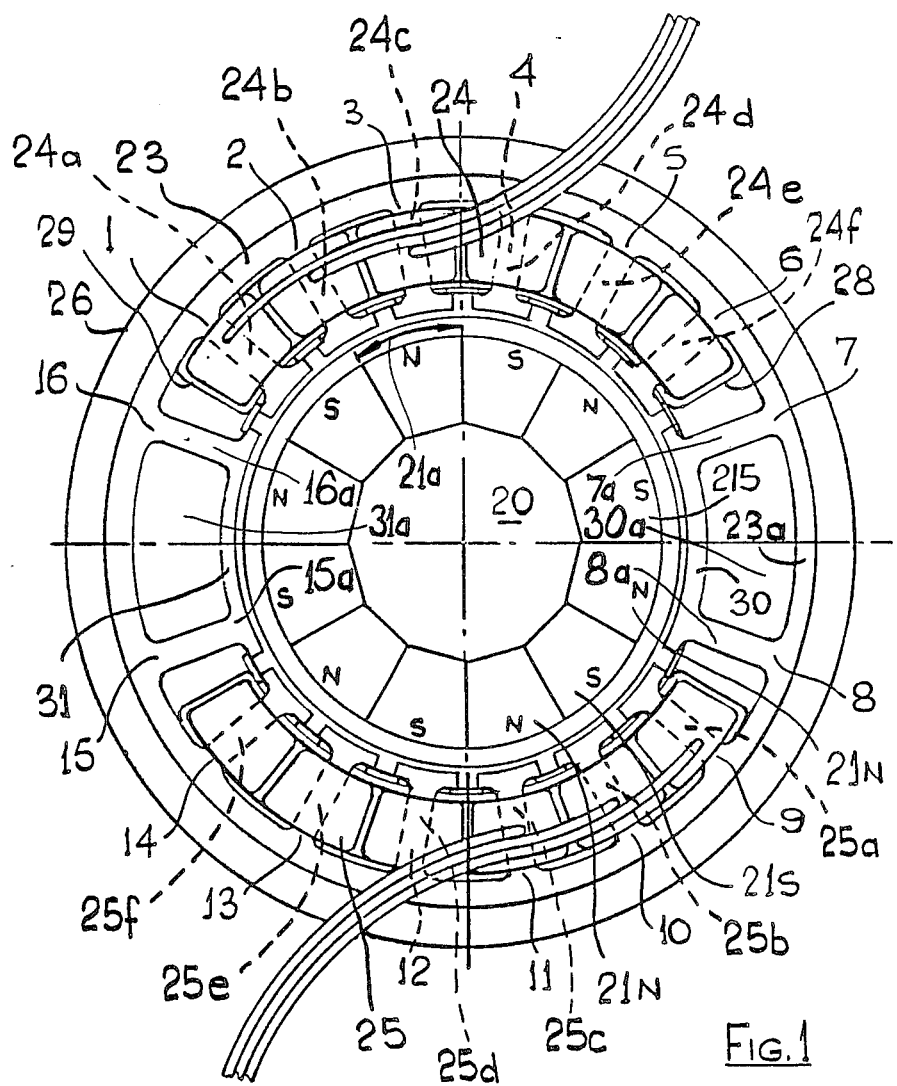
FIG. 1 is an end view of a first alternating-current electrical generator in accordance to the invention.

Referring to FIG. 1 a three phase alternating-current electrical generator comprises:
  a rotor 20;
  a layer of alternating magnetic pole sections 21N, 21S, which are formed as a part of the rotor 20;
  two three-phase windings 24, 25; and a stator 23 circumferentially disposed around and spaced from the magnetic pole sections.

The stator 23 has a laminated structure of for example, silicon iron which has sixteen teeth 1 to 16 which extend radially inwardly from a collar means 26 of the stator 23.

In this example the teeth are arranged in two blocks/groups of eight (1–7, 16 and 8–15). Each of the blocks/groups are arranged and interrelated so as to carry one of the three phase windings 24, 25.

The windings are substantially identical with one another and are formed from six subsidiary windings 24a–f, 25a–f respectively. The six subsidiary windings are then connected in series to form the respective independent windings 24, 25.

Each of the subsidiary windings is wound onto one of the teeth of the stator 23 leaving two teeth, one at each end, of each block/group without a winding wound thereon, i.e. teeth 7, 8, 15, and 16.

The adjacent end teeth of the respective stator 23 of the blocks/groups of teeth are separated from one another by a space 30a and 31a. The space 30a, 31a is approximately equal to that of two normal teeth separations i.e. equal to the separation between teeth 1 and 3.

Each of the end teeth (unwound teeth) has a tip section 7a, 8a, 15a and 16a respectively which are extended so that adjacent end teeth i.e. 7 to 8 and 15 to 16 are inter linked. This link is achieved by means of a bridge member 30, 31 which is supported by the respective unwound teeth and has an arcuate length equal to two pole section lengths. Thereby ensuring the magnetic flux effect described earlier ensues.

In operation the "Iron-losses", such as eddy currents, which would normally occur in each of the teeth 7, 8, 15 and 16 the edge section/yoke 23a of the stator 23, are significantly reduced because a closed magnetic circuit is formed by the bridge-pieces 30, 31 i.e. the magnetic flux going into each of the bridge-pieces 30, 31 is substantially equal to the magnetic flux going out of each of the bridge-pieces 30, 31. The residual magnetic flux that is transferred through the teeth 7, 8, 15 and 16 to the yoke 23a is small and insignificant and the heat problem in the stator 23 is thereby avoided.

Figure 2:
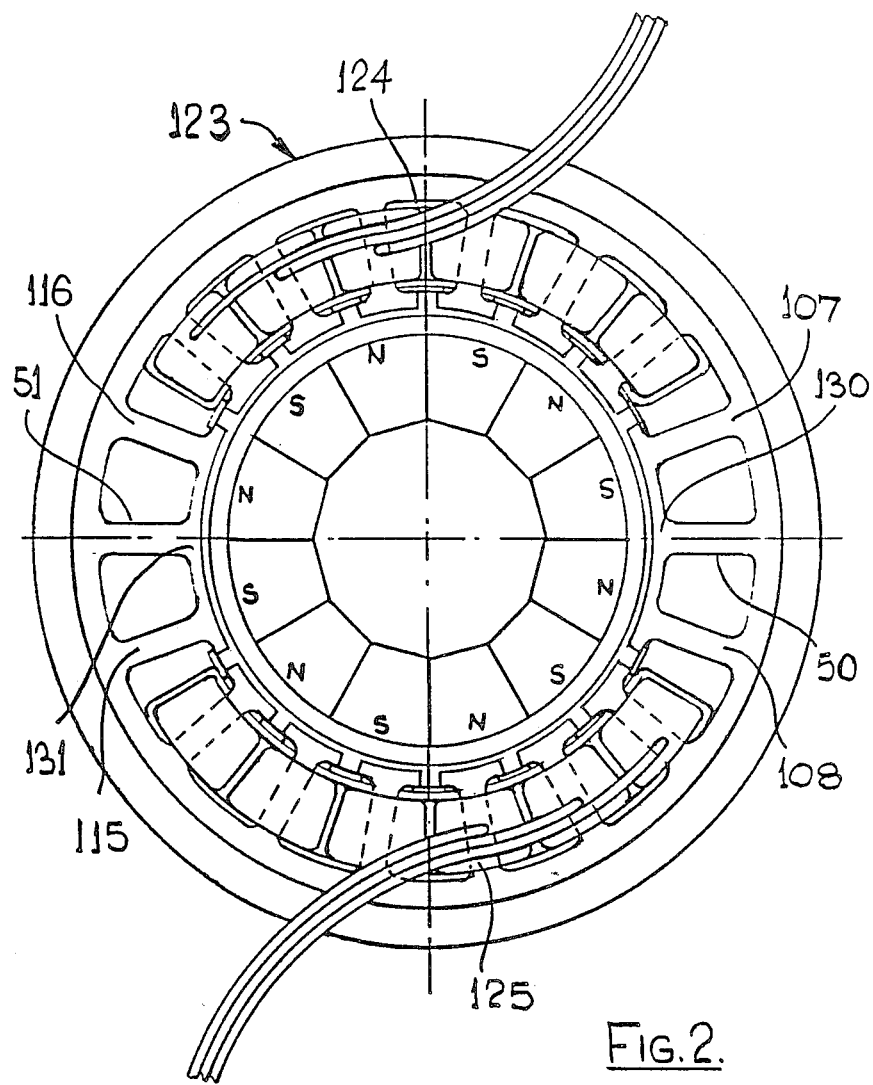
FIG. 2 is an end view of a second alternating-current electrical generator in accordance to the invention, and, FIG. 3 is an end view showing a third type of alternating-current electrical generator in accordance to the invention.

FIG. 2 shows a second type of generator which in most aspects is identical to that shown in FIG. 1, with identical parts having the same reference numerals with 100 added.

In this generator each of the bridge members 130, 131 connects together and is supported by three unwound teeth. The third unwound tooth 50, 51 being interposed centrally between teeth 107 and 108 and teeth 115 and 116 respectively so that the circumferential distance between the adjacent unwound teeth 107 and 50, 50 and 108, 115 and 51, 51 and 116 is the same as that between any one of the pairs of adjacent teeth associated with the windings 124 and 125.

The overall arcuate length of each of the bridge-pieces 130, 131 is still equal to two pole section pitches.

Figure 3:
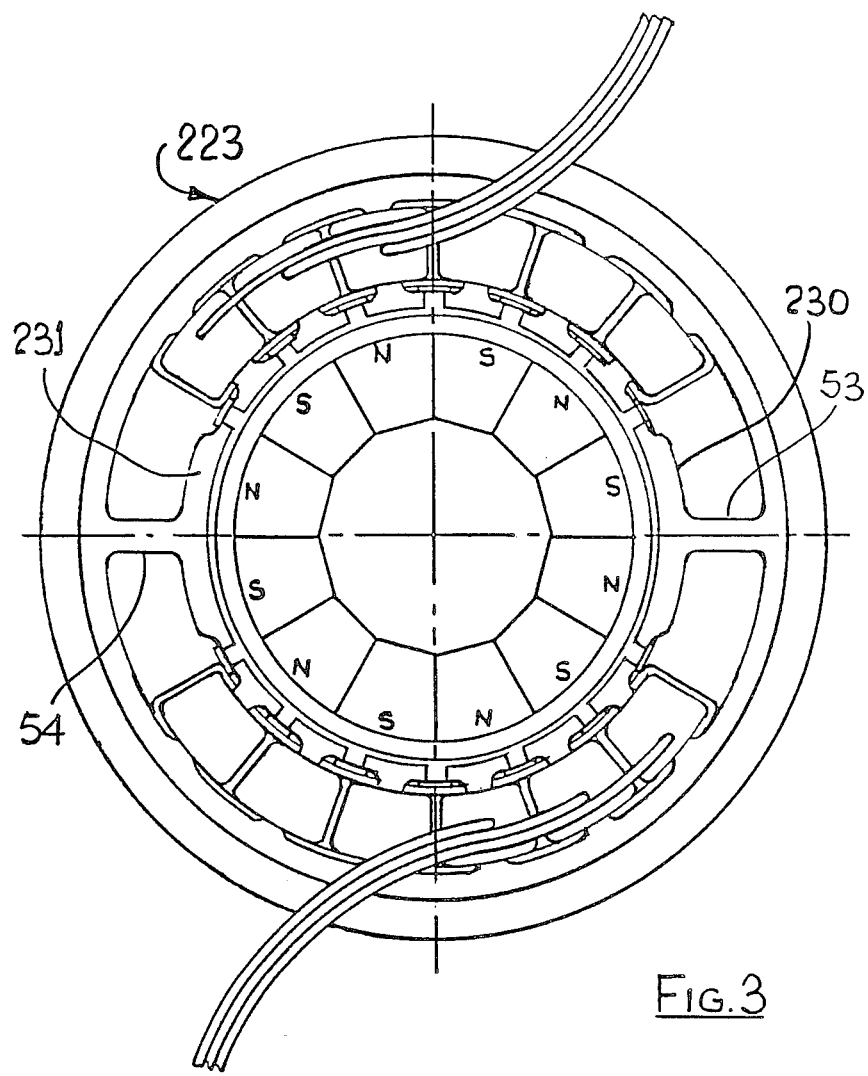

A third type of the generator is shown in FIG. 3 and in most respects is identical to that shown in FIG. 1, with identical parts to those described with respect to FIG. 1 having the same reference numerals with 200 added.

In this case each of the bridge-pieces 230, 231 is supported by a centrally positioned unwound tooth 53, 54 only. The arcuate length of each of the bridge members 230, 231 is still equal to two pole section pitches.

What we claim is:

1. An alternating-current electrical generator having reduced iron loss characteristics, which comprises:
   a rotor including a plurality of circumferentially spaced pole sections, each pole section has a pole section length that is substantially identical to the length of the other pole sections spaced about the circumference of the rotor;
   a stator, which has a number of teeth;
   at least two independent windings, each independent winding being electrically independent of one another and being wound on the teeth of the stator; and
   a plurality of bridge members having a length equal to an even number of pole section lengths; wherein the pole sections are circumferentially spaced at a constant pitch, and each of said bridge members is positioned between said at least two independent windings adjacent one another.

2. A generator as claimed in claim 1 wherein each of the bridge members is supported by at least one unwound tooth carried by the stator.

3. A generator as claimed in claim 2 wherein there are two unwound teeth supporting each of the bridge members.

4. A generator as claimed in claim 2 wherein there are the three unwound teeth suporting each of the bridge members.

5. A generator as claimed in claim 2 wherein the stator is formed from a laminated structure.

6. A generator as claimed in claim 1 wherein the pole sections are permanent magnets.

7. An alternating-current electrical generator, having reduced iron loss characteristics, which comprises:
   a rotor including a plurality of circumferentially spaced pole sections, each pole section has a pole section length that is substantially identical to the length of the other pole sections spaced about the circumference of the rotor;
   a stator having a number of teeth;
   at least two independent windings, each independent winding being electrically independent of one another and being wound on the teeth of the stator; and
   at least two bridge members having a length equal to an even number of pole section lengths;
   wherein each bridge member is positioned between adjacent independent windings so that the resulting fluxes induced in each bridge member are substantially equal but opposite one another thereby essentially eliminating the flux effects and reducing iron losses of the generator.

* * * * *